(12) United States Patent
Hamarneh

(10) Patent No.: US 12,082,747 B2
(45) Date of Patent: Sep. 10, 2024

(54) FOOD PROCESSING DEVICE WITH COUPLING UNIT HAVING A SLIDABLE MEMBER OPERABLY COMMUNICATING WITH A GEARBOX TO DRIVE A ROTATABLE BLADE

(71) Applicant: Omar Hamarneh, Amman (JO)

(72) Inventor: Omar Hamarneh, Amman (JO)

( * ) Notice: Subject to any disclaimer, the term of this patent is extended or adjusted under 35 U.S.C. 154(b) by 730 days.

(21) Appl. No.: 17/283,864

(22) PCT Filed: Oct. 9, 2018

(86) PCT No.: PCT/JO2018/050010
§ 371 (c)(1),
(2) Date: Apr. 8, 2021

(87) PCT Pub. No.: WO2020/075211
PCT Pub. Date: Apr. 16, 2020

(65) Prior Publication Data
US 2021/0378451 A1 Dec. 9, 2021

(51) Int. Cl.
*A47J 43/08* (2006.01)
*A47J 43/044* (2006.01)
*A47J 43/07* (2006.01)

(52) U.S. Cl.
CPC ........... *A47J 43/082* (2013.01); *A47J 43/044* (2013.01); *A47J 43/0711* (2013.01); *A47J 2043/04427* (2013.01)

(58) Field of Classification Search
CPC ........ A47J 36/10; A47J 43/042; A47J 43/046; A47J 43/0722; A47J 43/0761;
(Continued)

(56) References Cited

U.S. PATENT DOCUMENTS 3,335,772 A * 8/1967 Eberhard ............... A47J 43/044
241/293
5,360,170 A * 11/1994 Cartellone .......... A47J 43/0705
241/282.1

(Continued)

FOREIGN PATENT DOCUMENTS

DE 102012203425 A1 9/2013
EP 0475470 A2 3/1992
(Continued)

OTHER PUBLICATIONS

Austria International Searching Authority; International Search Report & Written Opinion for PCT/JO2018/050010; 9 pages; Mar. 4, 2019; Vienna, AT.
(Continued)

*Primary Examiner* — Charles Cooley
(74) *Attorney, Agent, or Firm* — Oblon, McClelland, Maier & Neustadt, L.L.P.

(57) ABSTRACT

A food processing device may be capable of blending foodstuff. The device may include an immersion blender having a shaft enclosed within a shaft housing, the shaft may be in operable connection with a first rotatable blade; a gearbox in operable connection with the immersion blender; a coupling unit having a wall and a slidable member; and a driver. The immersion blender may be configured to rotate the first rotatable blade. The coupling unit may be configured to connect the gearbox to the driver. The food processing device may further include a food processing container with a second rotatable blade. The immersion blender may be configured to rotate said second rotatable blade.

20 Claims, 21 Drawing Sheets

(58) Field of Classification Search
CPC .... A47J 43/085; A47J 43/075; A47J 43/0766; A47J 43/0772; A47J 43/0777; A47J 44/00; B02C 23/00
USPC .......................................................... 366/129
See application file for complete search history.

(56) References Cited

U.S. PATENT DOCUMENTS

| | | | |
|---|---|---|---|
| 6,000,650 A | 12/1999 | Penaranda et al. | |
| 2007/0133342 A1 | 6/2007 | Sergi et al. | |
| 2014/0203127 A1* | 7/2014 | Merl | A47J 43/0711 241/285.2 |
| 2015/0164279 A1* | 6/2015 | Ryan | A47J 44/02 366/279 |
| 2021/0267417 A1* | 9/2021 | Quinesser | A47J 43/0705 |
| 2021/0345830 A1* | 11/2021 | Hamarneh | A47J 43/0711 |

FOREIGN PATENT DOCUMENTS

| | | | | |
|---|---|---|---|---|
| EP | 0529287 | A2 | 3/1993 | |
| KR | 1448463 | B1 * | 10/2014 | ............ A47J 43/044 |
| KR | 101448463 | B1 | 10/2014 | |
| WO | WO-0048498 | A1 * | 8/2000 | .............. A47J 43/06 |
| WO | WO-2017133909 | A1 * | 8/2017 | .............. A47J 43/07 |
| WO | WO-2020064488 | A1 * | 4/2020 | .......... A47J 43/0705 |
| WO | WO-2020074970 | A1 * | 4/2020 | ............ A47J 43/044 |
| WO | WO-2020075211 | A1 * | 4/2020 | .......... A47J 43/0705 |

OTHER PUBLICATIONS

Austria International Searching Authority; International Search Report & Written Opinion for PCT/IB2019/052749; 7 pages; Jul. 11, 2019; Vienna, AT.

* cited by examiner

FOOD PROCESSING DEVICE WITH COUPLING UNIT HAVING A SLIDABLE MEMBER OPERABLY COMMUNICATING WITH A GEARBOX TO DRIVE A ROTATABLE BLADE

CROSS-REFERENCE TO RELATED APPLICATIONS

The present application is the national stage of and claims priority to international application PCT/JO2018/050010, filed on Oct. 9, 2018.

TECHNICAL FIELD

The present disclosure relates to food processing devices and apparatuses, and more particularly to automated food processing devices that are suitable for both indoor and outdoor uses.

BACKGROUND INFORMATION

Conventional food processing devices generally include an electrically powered driver, a food processing container with one or more blades and a removable lid.

Attempts to provide portable food processing devices have been made in the art. Those devices may be suitable for indoor and outdoor use; however, some are manually operated and require effort to have the food stuff processed while others are battery operated and have their own drivers, or actuators.

SUMMARY

One aspect of the present disclosure provides a food processing device capable of blending foodstuff, the device includes:
- an immersion blender having a shaft enclosed within a shaft housing, the shaft may be in operable connection with a first rotatable blade;
- a gearbox in operable connection with the immersion blender;
- a coupling unit having a wall and a slidable member; and
- a driver, wherein the coupling unit may be configured to connect the gearbox to the driver.

In some aspects, the food processing device may further include a food processing container with a base and a circumferential wall extending from the base, a handle, and a removable lid with a hingeably connected nozzle, an opening and a pass-through aperture, the base may have a second rotatable blade extending therefrom with a shaft including a plurality of grooves.

In other aspects, the first rotatable blade may include a shaft extending therefrom with a plurality of extrusions.

In aspects of the present disclosure, the plurality of grooves may be configured to receive the plurality of extrusions.

In other aspects, the immersion blender may further include a cap slidable over the shaft housing, and a coupling means configured to connect the immersion blender to the gearbox.

In some aspects, the immersion blender may be configured to rotate said second rotatable blade.

In yet other aspects, the opening of the removable lid may be configured to receive the immersion blender cap, and wherein the shaft and shaft housing may be configured to pass through the pass-through aperture.

In aspects of the present disclosure, the immersion blender cap may be slidable over the shaft housing only when such cap is connected to the opening of the removable lid.

In aspects of the present disclosure, the cap may be locked in a proximal position to the second rotatable blade when the cap is not connected to the removable lid opening.

In other aspects, the gearbox may include a housing, a lateral wall with a plurality of extrusions, an input shaft, an output shaft, and a plurality of gear sets.

In some aspects, the ratio of an angular speed of the output shaft to an angular speed of said input shaft ranges from about 5 to about 15.

In other aspects, the ratio of the angular speed of the output shaft to the angular speed of the input shaft is about 10.

In yet other aspects, the coupling unit may include a main wall with a plurality of lateral apertures configured to receive protrusions extending from the slidable member and a plurality of extrusions, and an auxiliary wall extending from the main wall.

In some aspects, the slidable member may include a first elongated member and a second elongated member coaxially aligned to each other, wherein the first elongated member may have an opening configured to receive an input shaft of the gearbox.

In other aspects, the second elongated member may be configured to be inserted in a driver's chuck.

In some aspects, the auxiliary wall may be lined with an elastic material.

In some aspects, the auxiliary wall may be tapered.

In other aspects, the auxiliary wall may be configured to circumfuse a substantial part of a driver's chuck.

In yet other aspects, the extrusions in said gearbox lateral wall may be configured to receive the plurality of grooves of said coupling unit.

In aspects of the present disclosure, the driver may include a rotary power tool with a chuck.

In some aspects, the driver may include a power drill.

BRIEF DESCRIPTION OF THE DRAWINGS

Aspects of the present disclosure will now be described with reference to the accompanying drawings, which illustrates embodiments of the present disclosure, without limiting the scope of thereof, and in which.

DETAILED DESCRIPTION OF THE DRAWINGS

Figure 1:
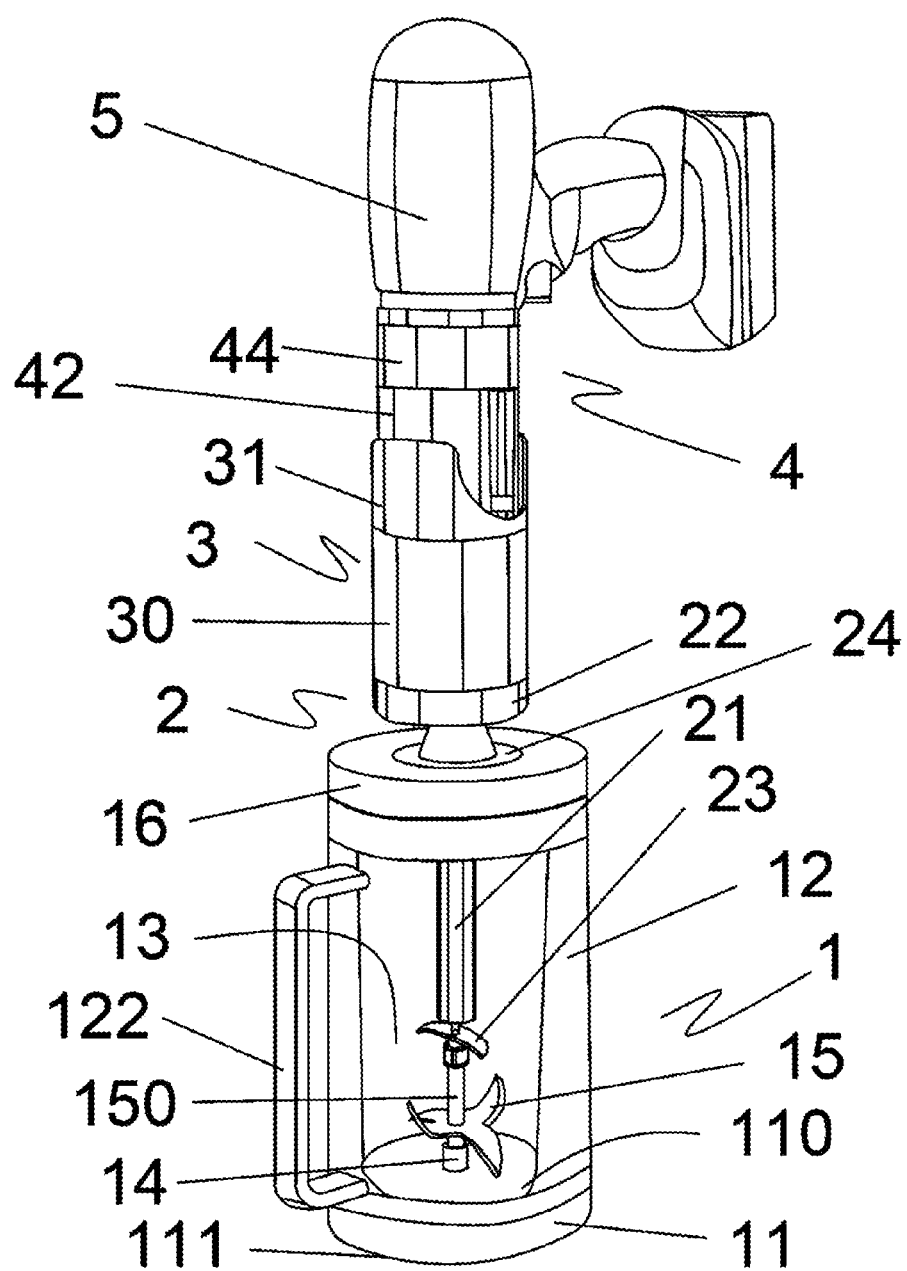
FIG. 1 illustrates a perspective view of a food processing device with a food processing container, the device being configured in accordance with embodiments of the present disclosure.

FIGS. 1-21 illustrate a food processing device that is suitable for outdoor use, and that does not need to be directly connected to an electric power source, the device being configured in accordance with embodiments of the present disclosure. Referring now to FIGS. 1-4, the food processing device may optionally include a food processing container 1, and may also include an immersion blender 2, a gearbox 3, a coupling unit 4, and a driver 5.

Figure 2:
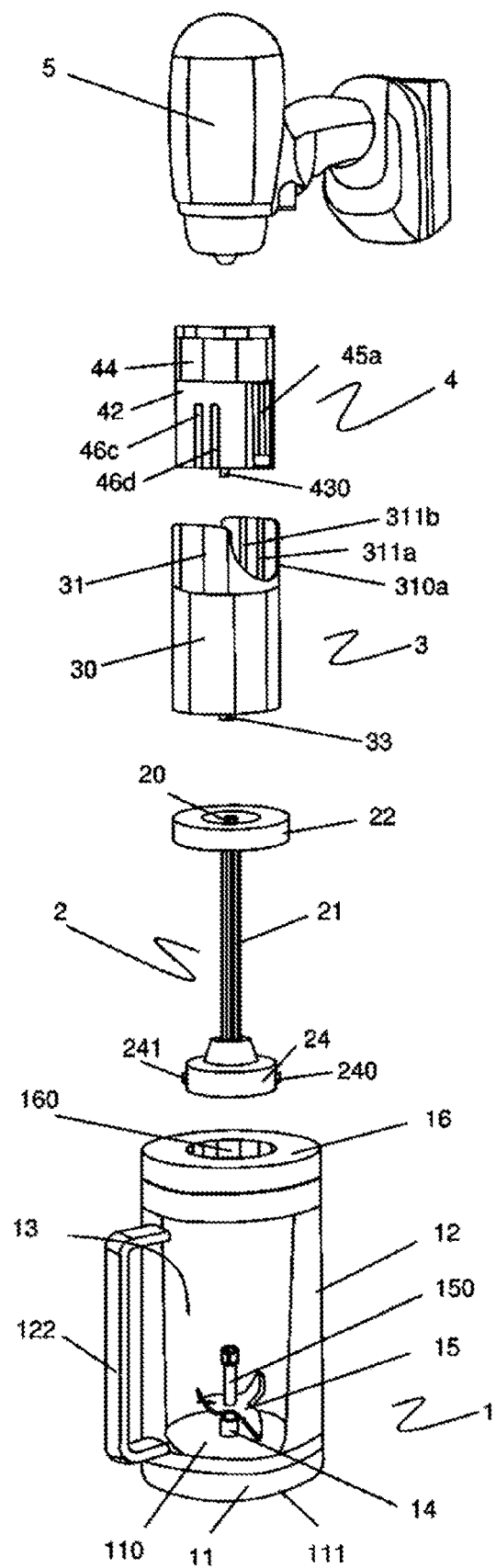
FIG. 2 illustrates an exploded view of a food processing device with a food processing container, the device being configured in accordance with embodiments of the present disclosure.
Figure 5:
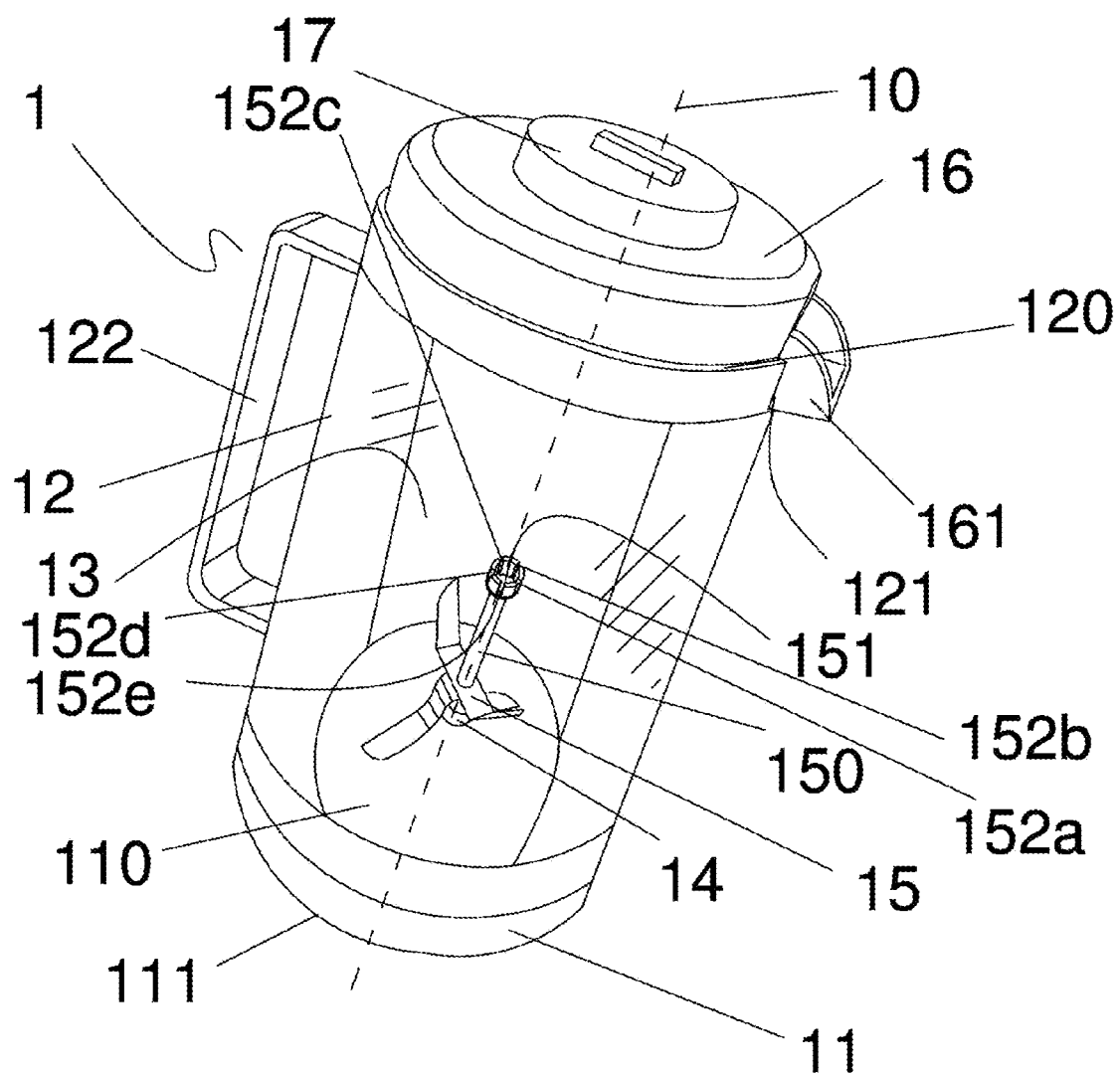
FIG. 5 illustrates a perspective view of a food processing container of a food processing device being configured in accordance with embodiments of the present disclosure.
Figure 6:
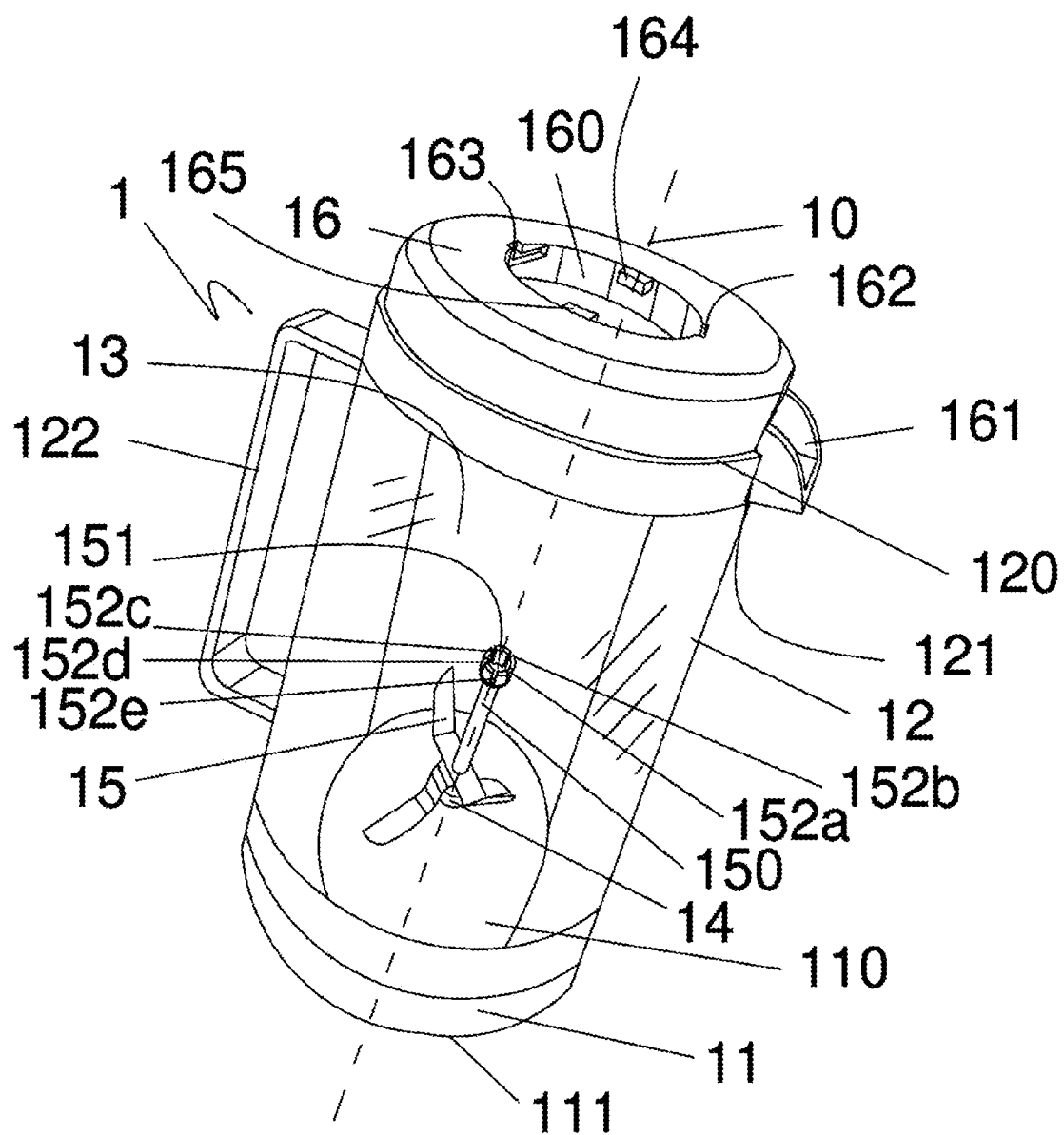
FIG. 6 illustrates a perspective view of a food processing container of a food processing device with a cap being detached, the device configured in accordance with embodiments of the present disclosure.
Figure 7:
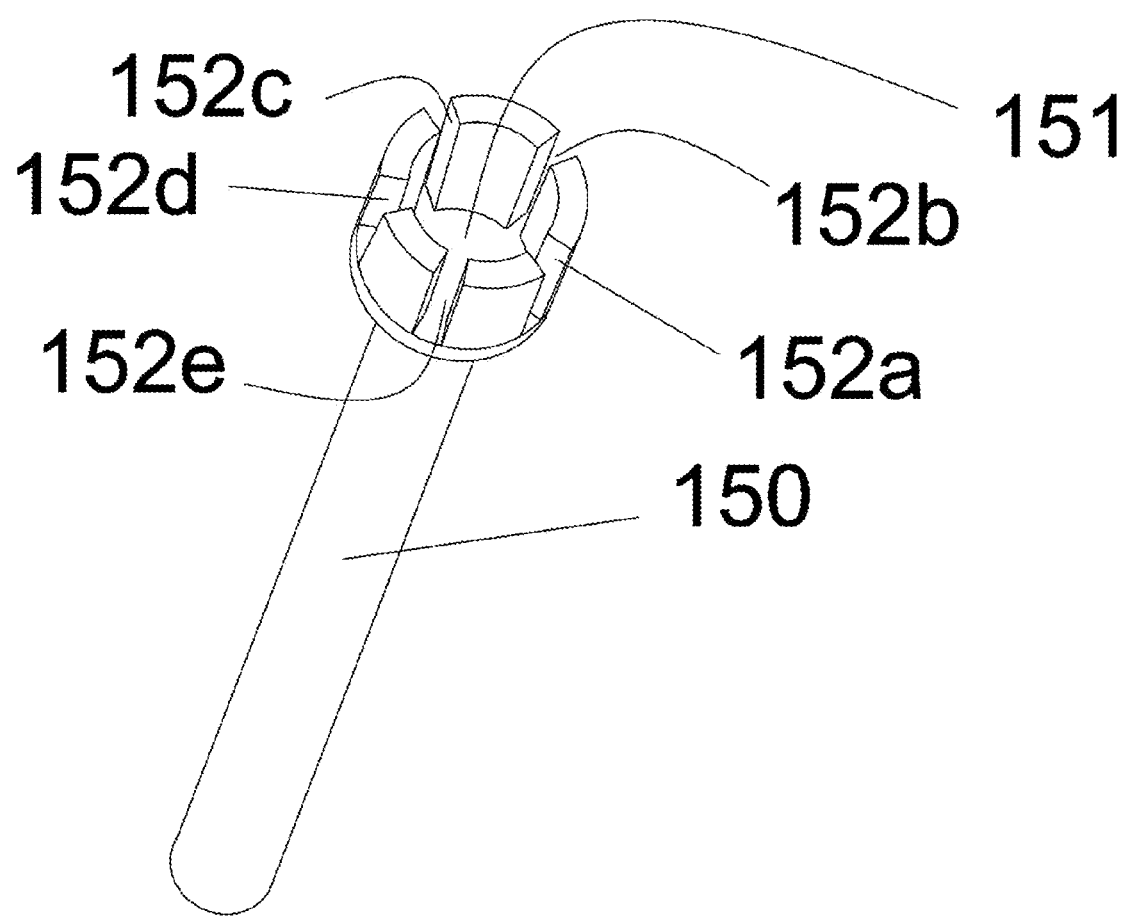
FIG. 7 illustrates a perspective view of a shaft extending from a second rotatable blade of a food processing container of a food processing device configured in accordance with embodiments of the present disclosure.

Referring now to FIGS. 5-7 with continued reference to FIGS. 1-2, the food processing container 1 may have a central axis 10, and may include a base 11 with an upper surface 110 and a lower surface 111, and a circumferential wall 12 extending vertically from the base 11 defining a space gap 13, the circumferential wall 12 may include an upper edge 120 having a cut 121, and a handle 122. The upper surface 110 of the base 11 may include a central protrusion 14 with a blade 15 rotatably connected to such protrusion 14. The blade 15 may include a shaft 150 extending therefrom and may be coaxially aligned with the central axis 10, wherein the shaft 150 may include an opening 151 in proximal position to the shaft's upper end with a plurality of lateral grooves 152a, 152b, 152c, 152d, 152e. The food processing container 1 may further include a detachable lid 16 that may cover the food processing container 1 when attached. The lid 16 may have a pass-through opening 160. In embodiments of the present disclosure, the upper edge 120 may be configured to receive a substantial part of the lid 16. The lid may also have a hingeably connected nozzle 161 to allow pouring liquid items into and from the food processing container 1, when needed. In embodiments of the present disclosure, the cut 121 of the circumferential wall 12 may be configured to receive the hingeably connected nozzle 161. In embodiments of the present disclosure, the pass-through opening 160 may include two grooves 162, 163, each having a substantially upright portion and a substantially inclined portion, and two or more intrusions 164, 165 extending radially inwardly towards the central axis 10 (FIG. 6).

In accordance with embodiments of the present disclosure, the two grooves 162, 163 may be opposing each other.

In embodiments of the present disclosure, the pass-through opening 160 of the lid 16 of the food processing container 1 may be configured to receive a cap 17 when the container 1 is not in use (FIG. 5).

Referring now to FIGS. 8-11, the immersion blender 2 may include a shaft 20 with a proximal end 200 and a distal end 201, a shaft housing 21 with a proximal end 210 and a distal end 211 with two opposing pins 2100, 2101 (FIGS. 13-14), a coupling means 22 in proximity to the proximal ends 200, 210 of the shaft 20 and the shaft housing 21, respectively. The immersion blender 2 in embodiments of the present disclosure may further include a blade 23 that may be connected in proximity to the distal end 201 of the shaft 20, and a cap 24 that may have a substantially inverted cup shape with two or more protruding members 240, 241, and two opposed openings 242, 243, and pass-through opening 246. The cap 24 may be configured to substantially cover the blade 23. In embodiments of the present disclosure, the distal end 201 of the shaft 20 may include a plurality of lateral protrusions 2010a, 2010b, 2010c, 2010d, 2010e.

Figure 8:
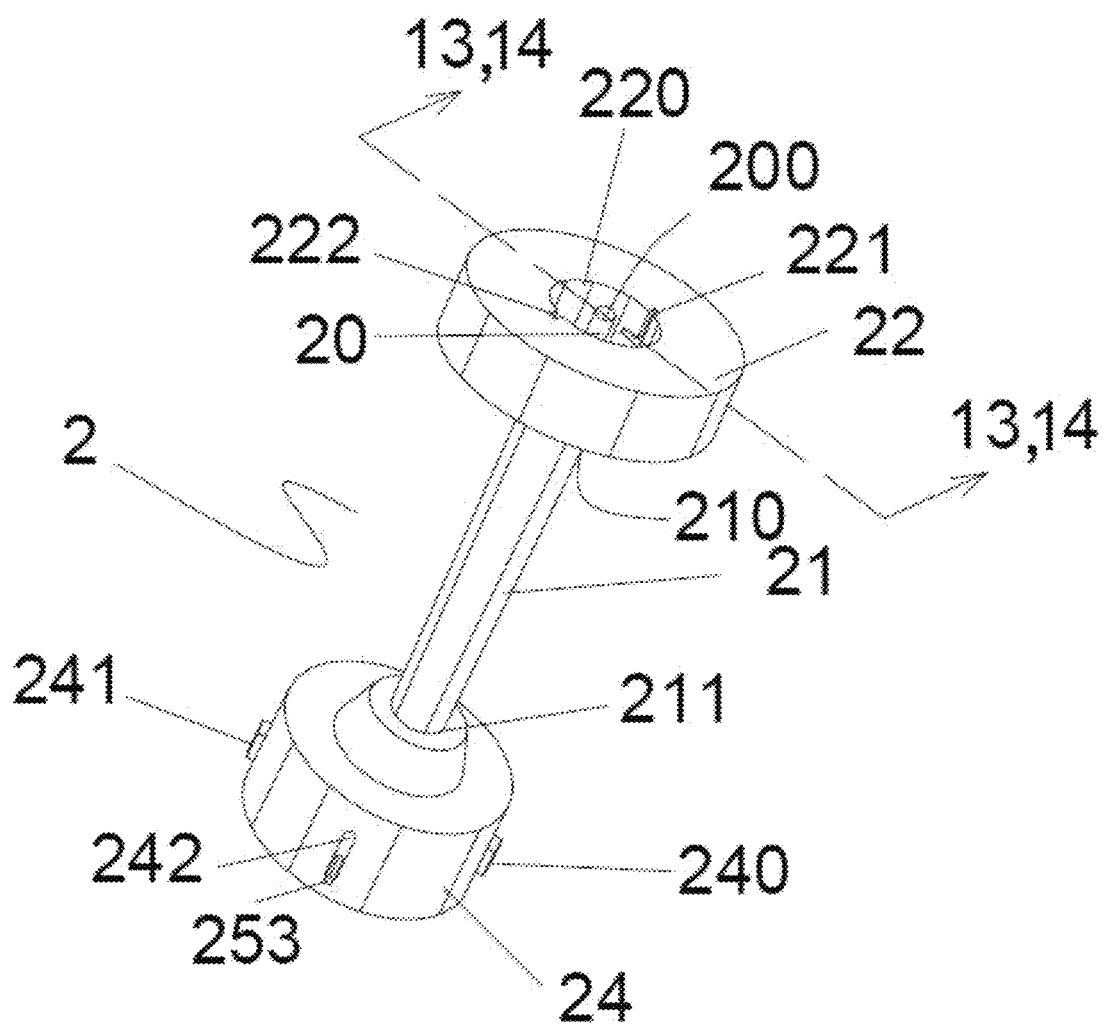
FIG. 8 illustrates a perspective view of an immersion blender of a food processing device configured in accordance with embodiments of the present disclosure.

The coupling means 22 may include an opening 220 with two opposing lateral grooves 221, 222, each having a substantially upright portion and a substantially horizontal portion that form a substantially L-shape (FIG. 8).

Figure 9:
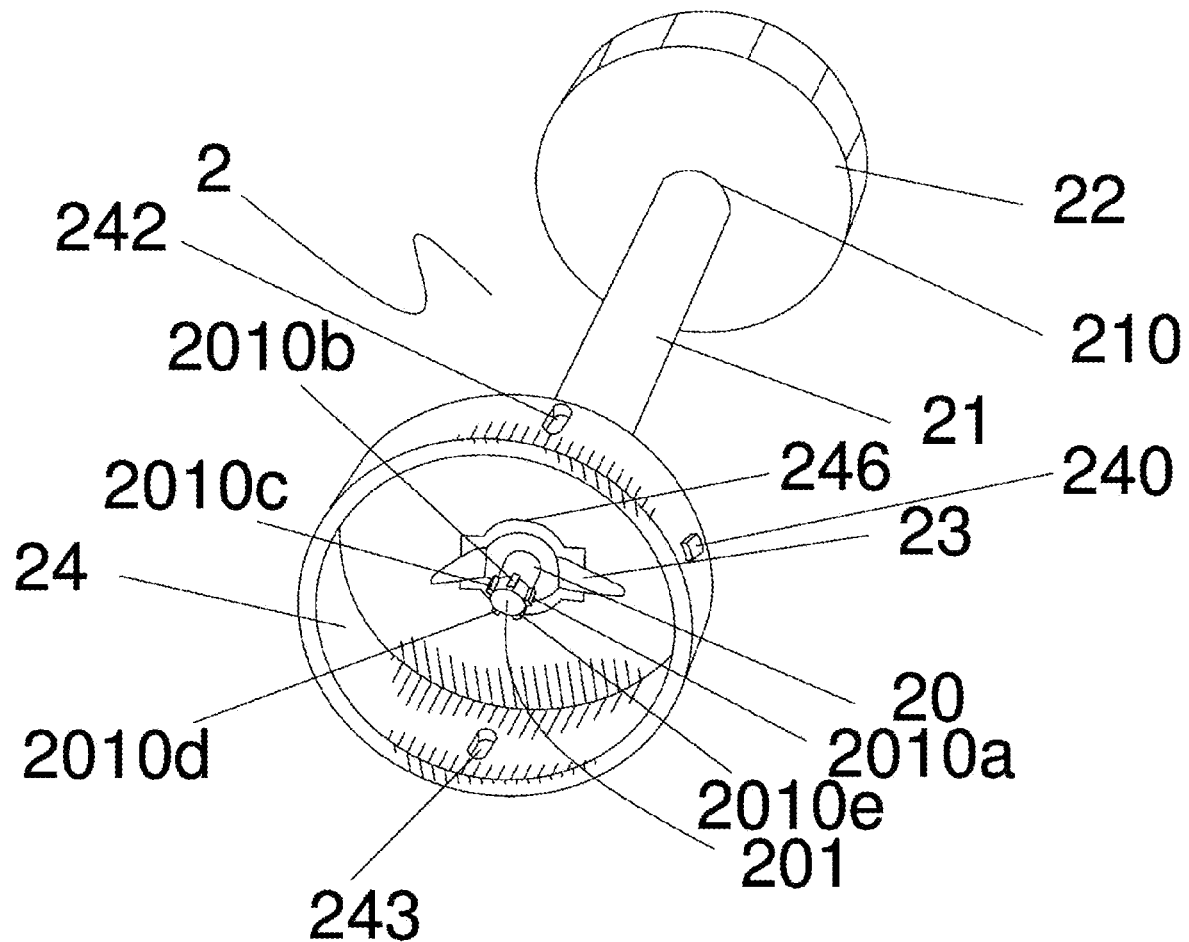
FIG. 9 illustrates a bottom perspective view of an immersion blender of a food processing device without a locking mechanism, the device configured in accordance with embodiments of the present disclosure.
Figure 10:
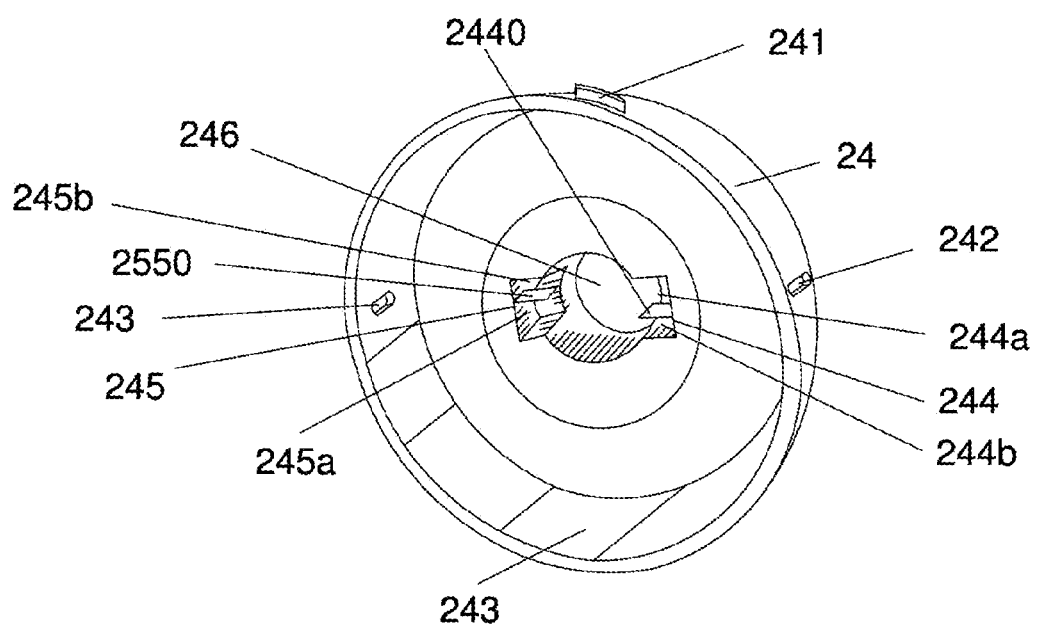
FIG. 10 illustrates a bottom perspective view of a cap of an immersion blender of a food processing device configured in accordance with embodiments of the present disclosure.

Referring now to FIGS. 9-10, the pass-through opening 246 of the cap 24 may include a first lateral groove 244 partially divided by means of a partitioning member 2440 into two sub-grooves, a substantially wide sub-groove 244a, and a substantially narrow sub-groove 244b. The pass-through opening 246 may also include a second lateral groove 245 partially divided by means of a partitioning member 2550 into two sub-grooves, a substantially wide sub-groove 245a, and a substantially narrow sub-groove 245b. Each of the first and second lateral grooves 244, 245 may be configured to receive either of the two pins 2100, 2101 of the shaft housing (FIG. 13).

Figure 11:
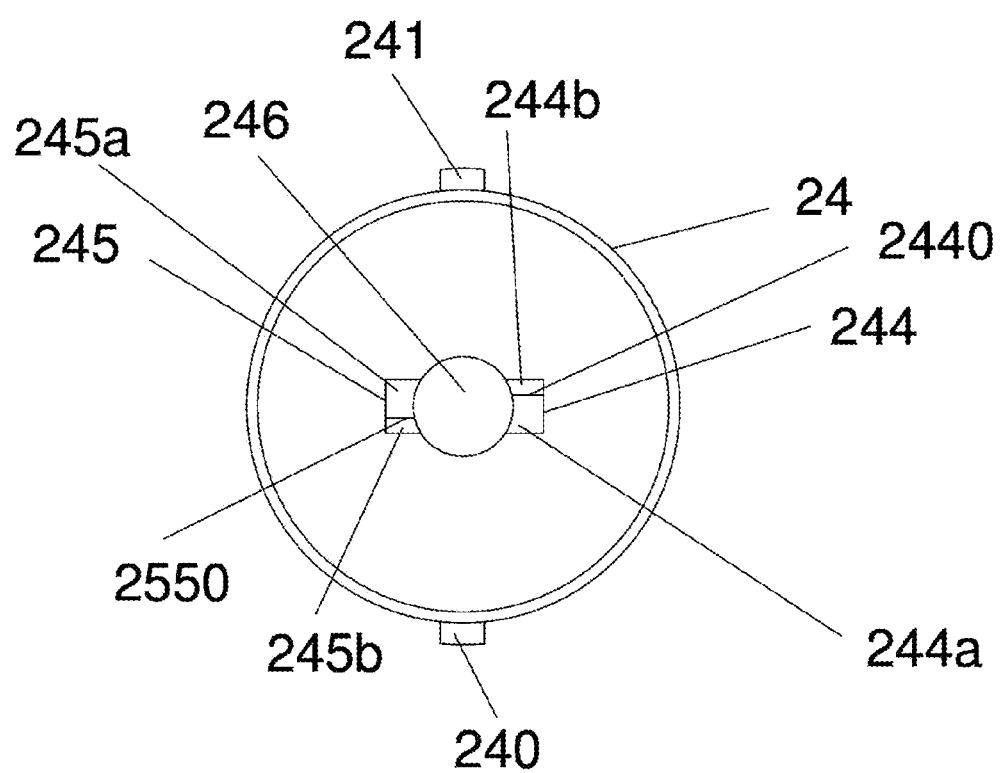
FIG. 11 illustrates a bottom view of a cap of an immersion blender of a food processing device configured in accordance with embodiments of the present disclosure.
Figure 12:
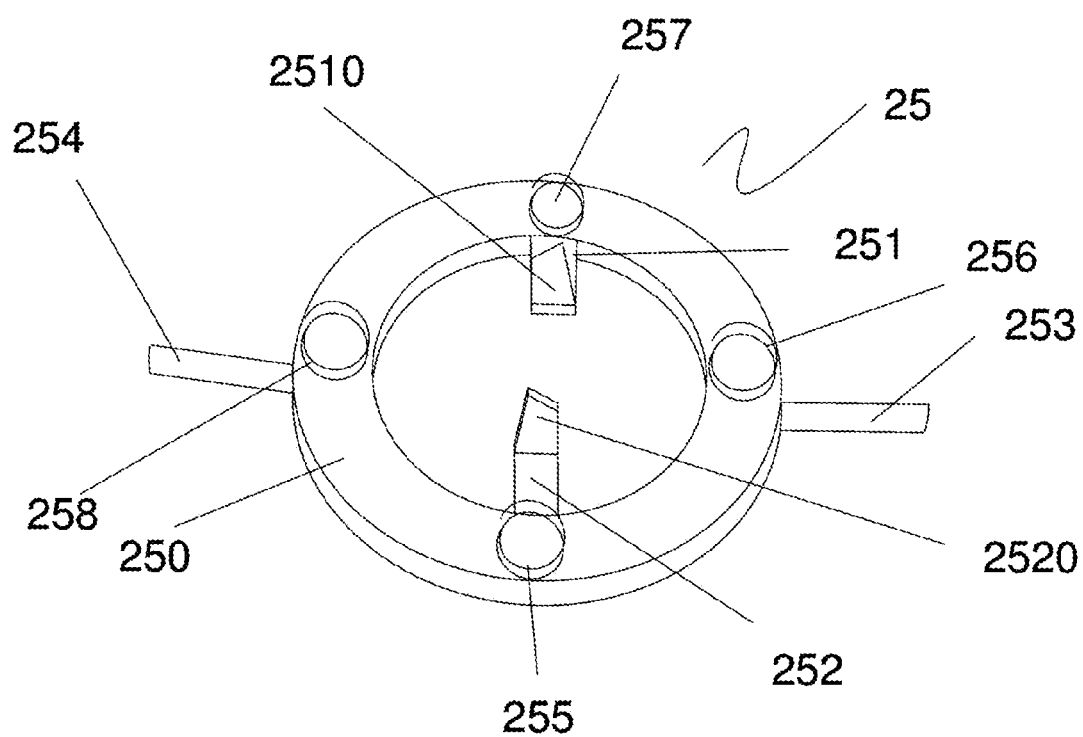
FIG. 12 illustrates a perspective view of a locking mechanism that can be embedded in an immersion blender of a food processing device configured in accordance with embodiments of the present disclosure.
Figure 13:
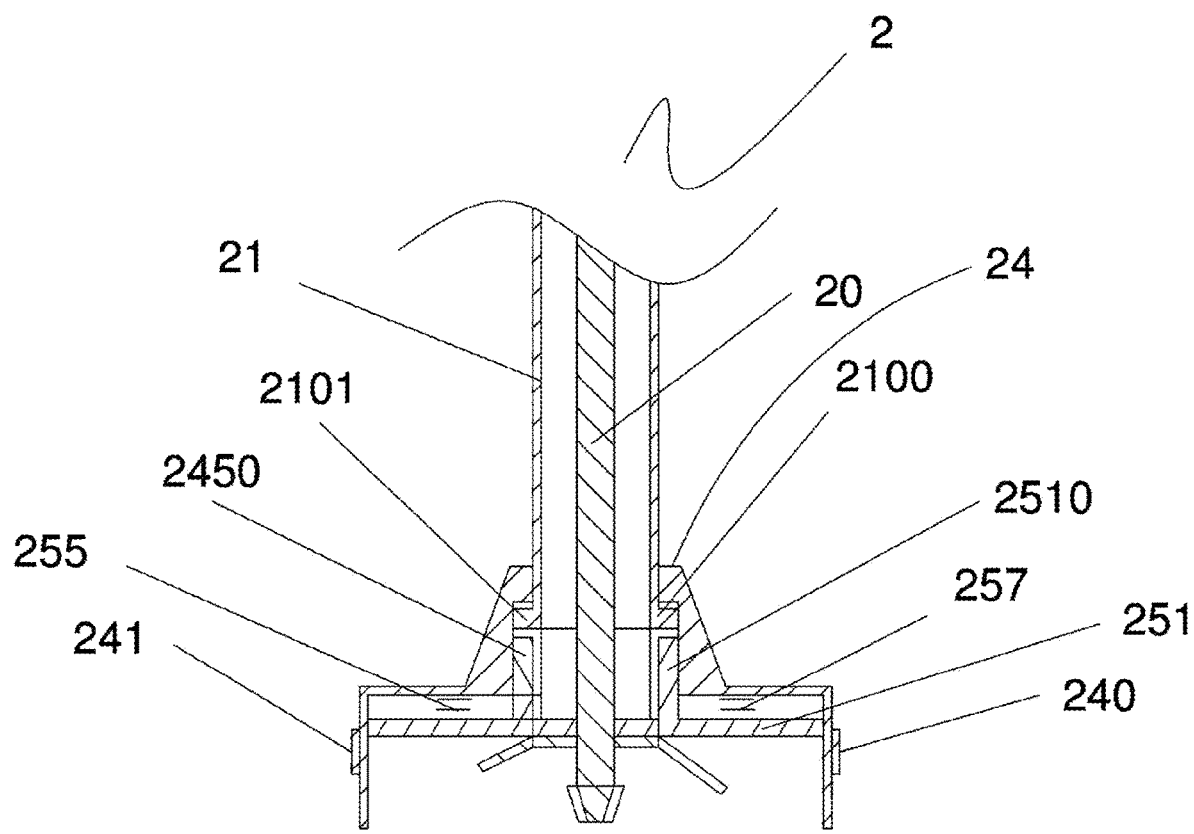
FIG. 13 illustrates a partial cross-sectional view of an immersion blender taken along the line 13,14-13,14 in FIG. 8, wherein the cross-section is taken with a shaft housing being locked to a cap of the immersion blender.
Figure 14:
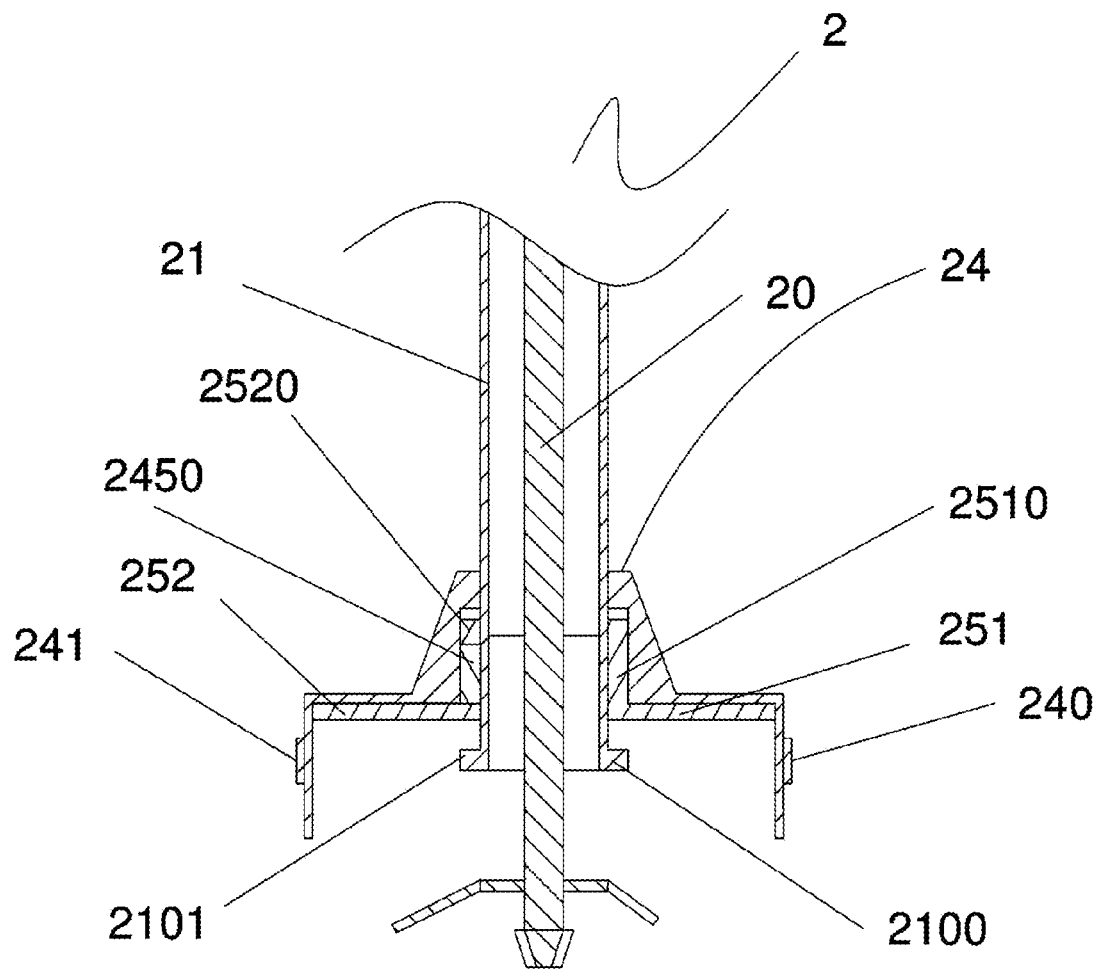
FIG. 14 illustrates a partial cross-sectional view of an immersion blender taken along the line 13,14-13,14 in FIG. 8, wherein the cross-section is taken with a shaft housing being unlocked from a cap of the immersion blender.

Referring now to FIGS. 12-14 with continued reference to FIGS. 10-11, the cap 24 may also include a locking mechanism 25 embedded therewith, wherein such mechanism 25 may be configured to lock the cap 24 in a proximal position to the distal end 211 of the shaft housing 211 (FIG. 9) when the immersion blender is not connected to the food processing container 1, as illustrated in FIG. 13. Alternatively, the locking mechanism 25 may also be configured to unlock the cap 24 from the shaft housing 21 and allow the shaft housing 21 to slide within the pass-through opening 246 of the cap 24 only when the immersion blender is connected to the food processing container, as illustrated in FIG. 14. The locking mechanism 25 in embodiments of the present disclosure may include a substantially ring-shaped body 250 with a first horizontal intrusion 251, and a second horizontal intrusion 252, each extending radially inwardly towards a center of the ring-shaped body 250. The first horizontal intrusion 251 may include a first protrusion 2510 extending substantially upwardly from the first horizontal intrusion 251, and the second horizontal intrusion 252 may include a second protrusion 2520 extending substantially upwardly from the second horizontal intrusion 252. The locking mechanism 25 may also include a first pin 253, and a second pin 254, each being extending radially outwardly from the ring-shaped body 250, and may be collinearly aligned with each other. A plurality of compression springs 255, 256, 257, 258 may be attached to an upper surface of the ring-shaped body 250.

In embodiments of the present disclosure, each of the two substantially wide sub-grooves 244a, 245a (FIGS. 10-11) may be configured to substantially receive either the first protrusion 2510 or the second protrusion 2520 of the ring-shaped body 250, as well as either of the two pins 2100, 2101 of the shaft housing 21 when the cap 24 is being locked to the shaft housing 21, as illustrated in FIG. 13. In such locked state (i.e. a default state), the pins 2110, 2101 are positioned just above the first protrusion 2510 and the second protrusion 2520 in the substantially wide sub-grooves 244a, 245a, wherein the first protrusion 2510 and the second protrusion 2520 may act as stopping means for the pins 2110, 2101 and prevent the shaft housing 21 from sliding within the pass-through opening 246. Locking the cap 24 to the shaft housing 21, when the immersion blender is not connected to the food processing container, may protect a user from any potential injury that could be caused by the blade 23 since such locking action will keep a substantial part of the blade 23 covered by the cap 24.

The immersion blender 2 may be connected to the food processing container 1 by inserting a substantial part of the cap 24 in the pass-through opening 160 while allowing the pin 253 to pass through the substantially upright portion of the groove 162 and allowing the pin 254 to pass through the substantially upright portion of the groove 163. Then, the cap 24 together with the shaft housing may be rotated about the shaft 20 such that the pin 253 slides within the substantially inclined portion of the groove 162 and the pin 254 slides within the substantially inclined portion of the groove 162, thus moving the ring-shaped body 250 upwards towards the surface 247 of the cap 24 and compressing the springs 255, 256, 257, 258. When the ring-shaped body 250 moves towards the surface 247, the first protrusion 2510 and the second protrusion 2520 may force the pins 2100, 2101 to also move towards the surface 247 of the cap 24 beyond the partitioning members 2440, 2550, thus the shaft housing 21 may become free to rotate in a confined manner about the shaft 20 relative to the cap 24 to become in an unlocked position. In the unlocked position, the pins 2100, 2101 may be able to pass through the relatively narrow sub-grooves 244b, 245b, thus the shaft housing 21 may be able to slide and rotate within the pass-through opening 246.

In embodiments of the present disclosure, the sliding movement of the pins 253, 254 in the substantially inclined portions of the grooves 262, 163 may move the two or more protruding members 240, 241 of the cap 24 to be aligned with and below the two or more intrusions 164, 165. This configuration may temporarily lock the cap 24 to the lid 16.

To relock the shaft housing 21 to the cap 24, the shaft housing 21 may slide within the pass-through opening 246 of the cap 24 towards the surface 247 such that the pins 2100, 2101 pass through the substantially narrow sub-grooves 244b, 245b, then the shaft housing may be rotated such that the pins 2100, 2101 move from the substantially narrow sub-grooves 244b, 245b to the substantially wide sub-grooves 244a, 245a. Further rotation of the shaft housing 21 may be effected in order to cause a sliding motion of the pins 243, 253 within the substantially inclined portions of the grooves 162, 163 towards the substantially upright portions of the grooves 162, 163 and in order to misalign the two or more protruding members 240, 241 with the two or more intrusions 164, 165. The sliding motion of the pins 253, 254 within the substantially inclined portions towards the substantially upright portions of the grooves 162, 163 moves the ring-shaped body 250 away from the surface 247 of the cap 24, and due to gravity, the shaft housing 21 may move a limited distance downwards such that the pins 2100, 2101 become trapped by the partitioning members 2440, 2550 and the first and second protrusions 2510, 2520, thus locked back to the cap 24.

Reference is now being made to FIGS. 7-9. In embodiments of the present disclosure, each of the lateral grooves 152a, 152b, 152c, 152d, and 152e of the shaft 150 of the blade 15 may be configured to receive one of the lateral protrusions 2010a, 2010b, 2010c, 2010d, 2010e, respectively. Such a connection between the shaft 150 and the shaft 20 would allow an operable connection between the immersion blender 2 and the blade 15, therefore the immersion blender 2 may be capable of driving the blade 15.

In embodiments of the present disclosure, the immersion blender 2 may operate without the need to be connected to the food processing container (FIGS. 3-4), wherein the cap 24 remains locked in a proximal position to the blade 23.

Figure 15:
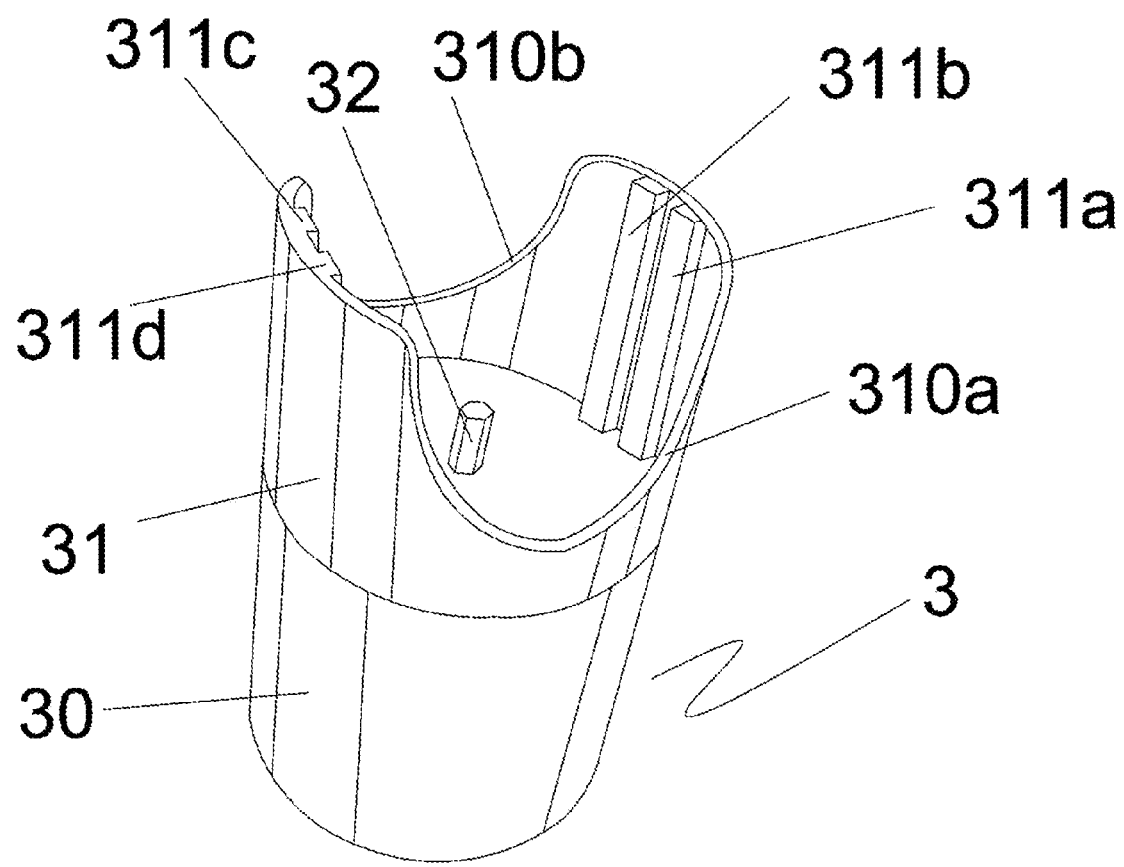
FIG. 15 illustrates a perspective view of a gearbox of a food processing device configured in accordance with embodiments of the present disclosure.
Figure 16:
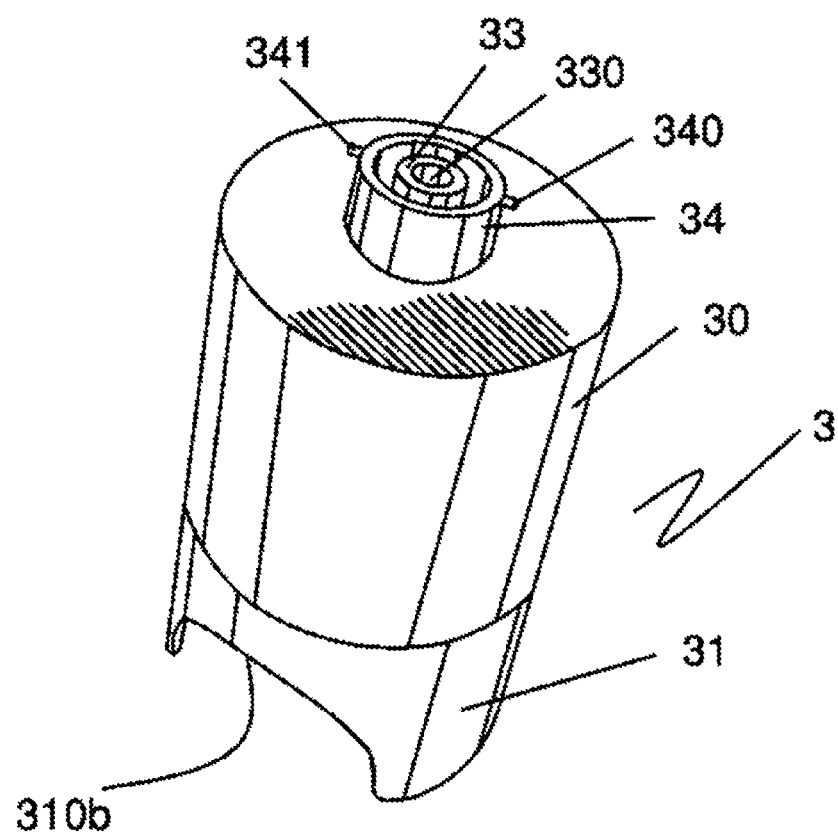
FIG. 16 illustrates a bottom perspective view of a gearbox of a food processing device configured in accordance with embodiments of the present disclosure.

Referring now to FIGS. 15-16, the gearbox 3 in embodiments of the present disclosure may include a plurality of gear sets (not shown) enclosed within a housing 30, a lateral wall 31 that may extend substantially vertically from the housing 30, an input shaft 32 connected to at least one of the gear sets, and an output shaft 33 connected to at least one of the gear sets. The lateral wall 31 may include two cuts 310a, 310b, and a plurality of lateral protrusions 311a, 311b, 311c, 311d extending substantially vertically from an inside of the lateral wall 31. The input shaft 32 may have a polygonal profile and the output shaft 33 may have an opening 330 that may be configured to receive the proximal end 200 of the shaft 20 of the immersion blender 2. The output shaft 33 may be laterally circumfused by a wall 34 having two protrusions 340, 341 extending radially outwardly therefrom.

Figure 17:
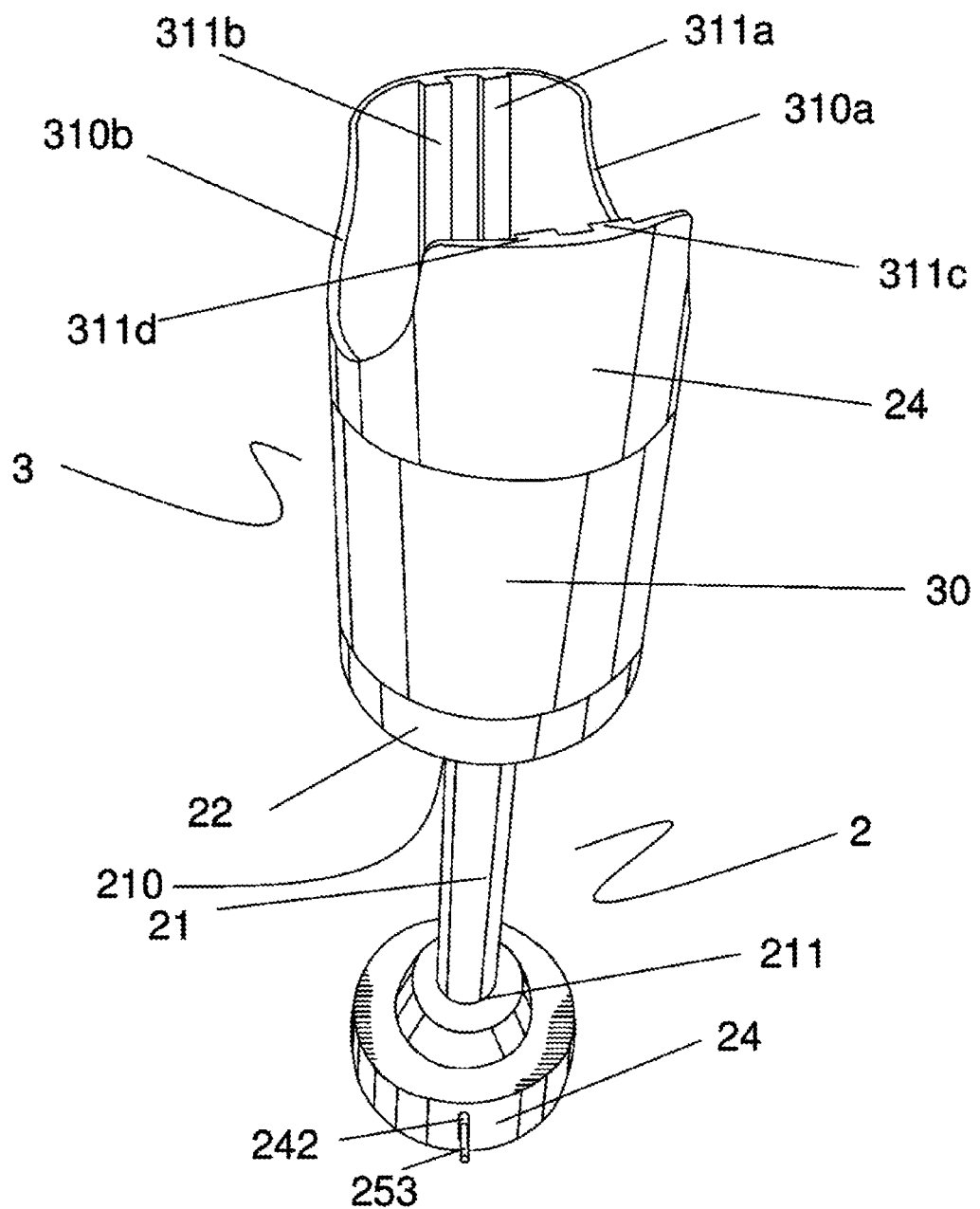
FIG. 17 illustrates a perspective view of a gearbox being connected to an immersion blender of a food processing device configured in accordance with embodiments of the present disclosure.
Figure 18:
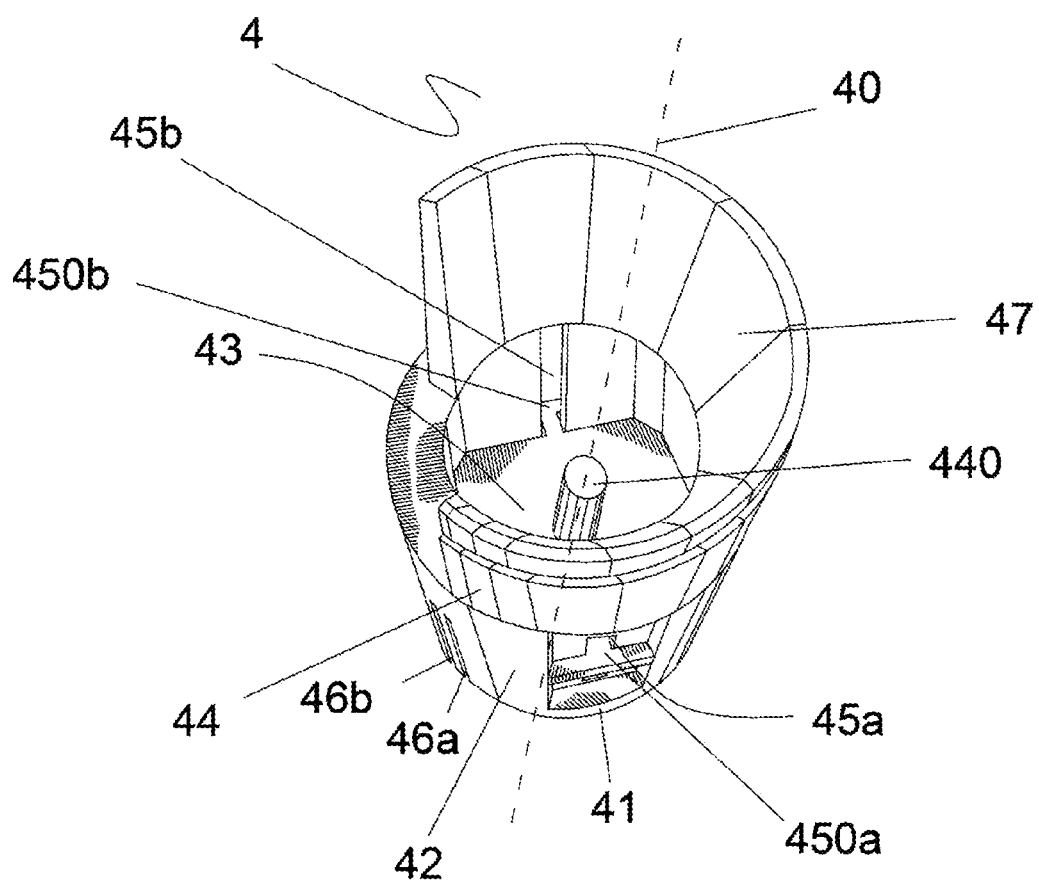
FIG. 18 illustrates a perspective view of a coupling unit of a food processing device configured in accordance with embodiments of the present disclosure.
Figure 19:
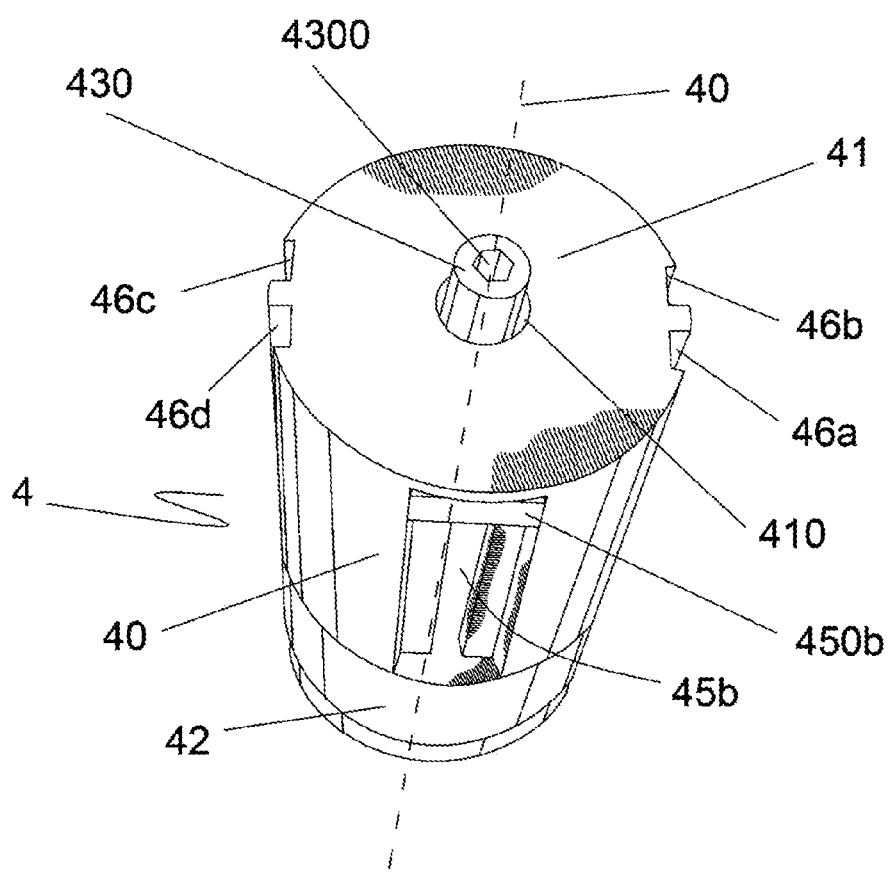
FIG. 19 illustrates a bottom perspective view of a coupling unit of a food processing device configured in accordance with embodiments of the present disclosure.
Figure 20:
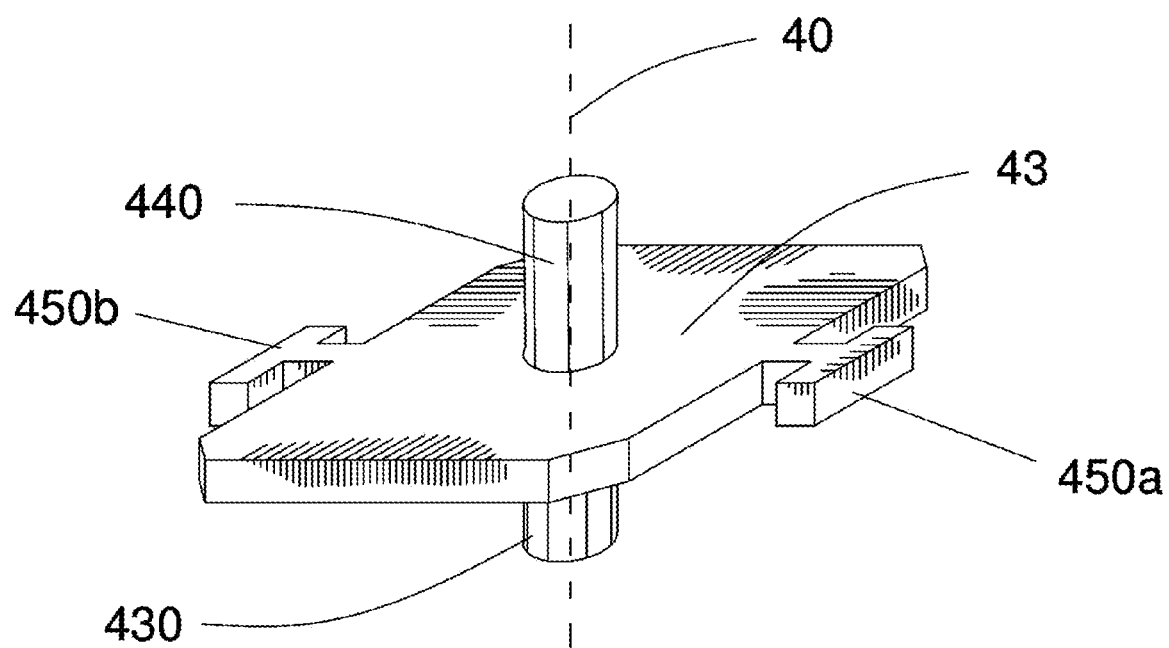
FIG. 20 illustrates a perspective view of a sliding member of a coupling unit of a food processing device configured in accordance with embodiments of the present disclosure.
Figure 21:
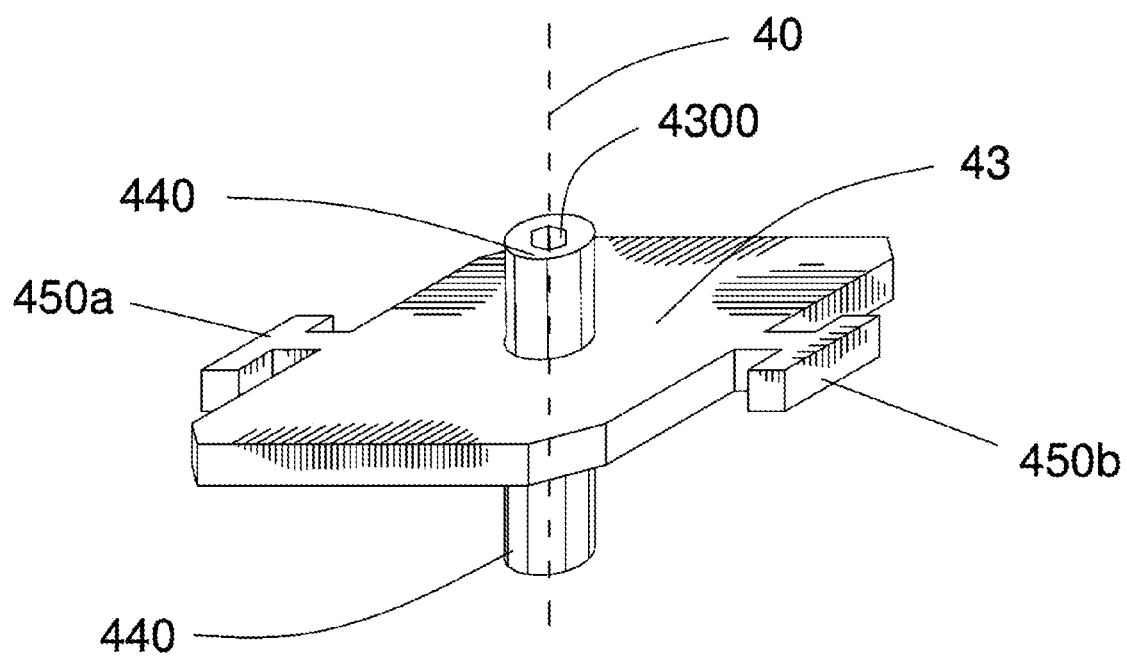
FIG. 21 illustrates a bottom perspective view of a sliding member of a coupling unit of a food processing device configured in accordance with embodiments of the present disclosure.

Referring to FIGS. 8, 16-17, the coupling means 22 may be configured to operably connect the immersion blender 2 to the gearbox 3. Such connection may be achieved by inserting the wall 34 of the gearbox 3 in the opening 220 of the coupling means 22 with the two extending protrusions 340, 341 passing through substantially vertical portions of the substantially L-shaped grooves 340, 341, then rotating the gearbox 3 relative to the immersion blender 2 such that the two extending protrusions 340, 341 slides in the substantially horizontal portions of the lateral grooves 221, 222 thus preventing any relative linear motion between the immersion blender 2 and the gearbox 3. In embodiments of the present disclosure, the insertion of the wall 34 in the opening 220 may force the opening 330 of the output shaft 33 of the gearbox 3 to receive the proximal end 200 of the shaft 20 of the immersion blender 2. The dimensions of the opening 330 and the proximal end 200 of the shaft 20 should be selected to allow the transmission of rotary movement of the output shaft 33 to the shaft 20 of the immersion blender.

Referring back to FIG. 15 with continued reference to FIG. 16, the speed ratio of the output shaft 33 to the speed of the input shaft 32 of the gearbox 3 may range between about five to one, to about fifteen to one (i.e. from about 5:1 to about 15:1). The difference in angular speed of the output shaft 33 to the input shaft 32 may be needed in order to provide efficient food processing capability, and may be achieved by the gear sets, which may have a conventional design, including but not limited to, spur gears, helical gears, planetary gears, or helical gears. The use of the gearbox 3 may allow for the use of a driver 5 having a low "rotation per minute" specification.

Referring now to FIGS. 18-21, the coupling unit 4 may include a central axis 40, a base 41, a main wall 42 extending vertically from the base 41, a sliding member 43, and an auxiliary wall 44 extending from a substantial part of the main wall 42. The base 41 may include a pass-through opening 410 aligned with the central axis 40, and the sliding member 43 may include a first elongated member 430 and a second elongated member 440, wherein the first and second elongated members 430, 440 may be coaxially aligned with the central axis 40 and may extend in opposing directions to each other. The first elongated member 430 may be able to pass through the pass-through opening 410 of the base 40 and may include a polygonal aperture 4300 having a similar profile as the input shaft 32 of the gearbox 3. In embodiments of the present disclosure, the main wall 42 may include a plurality of lateral apertures 45a, 45b, and a plurality of lateral grooves 46a, 46b, 46c, 46d formed on an outside surface of the main wall 42. The sliding member 43 may further include a plurality of protrusions 450a, 450b passing through the plurality of lateral apertures 45a, 45b, wherein such plurality of protrusions 450a, 450b may allow a user to slide the sliding member 43 along the axis 40.

The sliding member 43 may slide within the coupling unit 4 along the central axis 40 when a user slides the plurality of protrusions 450a, 450b through the plurality of the lateral apertures 45a, 45b.

In embodiments of the present disclosure, the auxiliary wall 44 may be lined with an elastic material 47, such as rubber, and may have a tapered inner surface.

Each of the plurality of grooves 46a, 46b, 46c, 46d of the coupling unit may be configured to receive each of the plurality of the protrusions 311a, 311b, 311c, 311d of the gearbox housing, thus connecting the coupling unit 4 to the gearbox housing 30, such a connection may prevent any relative angular displacement between the gearbox housing 30 and the coupling unit 4. In embodiments of the present disclosure, the polygonal aperture 4300 of the coupling unit may be configured to receive the input shaft 32 of the gearbox 3, wherein the similar profile of the input shaft 32 of the gearbox 3 and the polygonal aperture 4300 may prevent relative rotation between such input shaft 32 and the coupling unit 4 while ensuring operable connection between the gearbox 3 and the coupling unit 4.

In embodiments of the present disclosure, the coupling unit 4 may provide an interface between the driver 5 and the gearbox 3 (FIGS. 1-4). The immersion blender 2 may connect the gearbox 3 to the food processing container 1 (FIGS. 1-2).

Referring back to FIGS. 1-4 with continued reference to FIGS. 18-21, the driver 5 in embodiments of the present disclosure may include a conventional rotary power appliance, such as a drilling tool. The chuck of the drilling tool may receive the second elongated member 440 of the coupling unit 4 in the place dedicated for drilling bits, and the auxiliary wall 44 of the coupling unit 4 may be configured to circumfuse a substantial part of the chuck. Such a configuration may allow the coupling unit 4 to rotate with the chuck of the driver 5 about the central axis 40 when the driver 5 is operated. In embodiments of the present disclosure, the coupling unit 4 may prevent dust and/or debris suspended on the chuck of the drilling tool from being transferred to the food items being processed. The configuration of the sliding member 43, the auxiliary wall 44, and the elastic material 47 may allow the device of the present disclosure to be compatible with different sizes of the driver 5.

Referring back to FIGS. 1-2, the immersion blender 2 in embodiments of the present disclosure may be used in connection with the food processing container 1 to blend food items contained in such container 1, wherein the blending may be done by the blades 15, 23.

Figure 3:
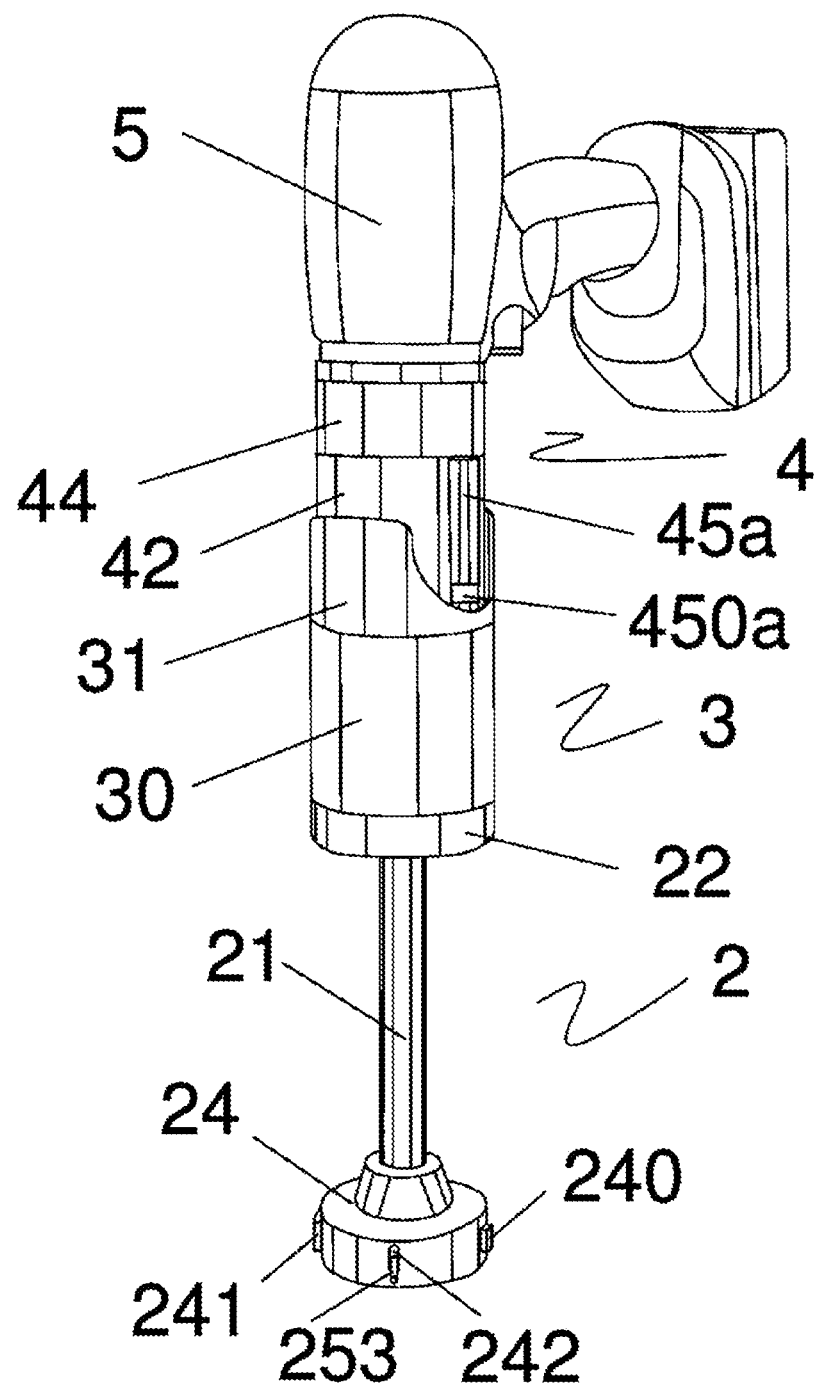
FIG. 3 illustrates a perspective view of a food processing device without a food processing container, the device being configured in accordance with embodiments of the present disclosure.
Figure 4:
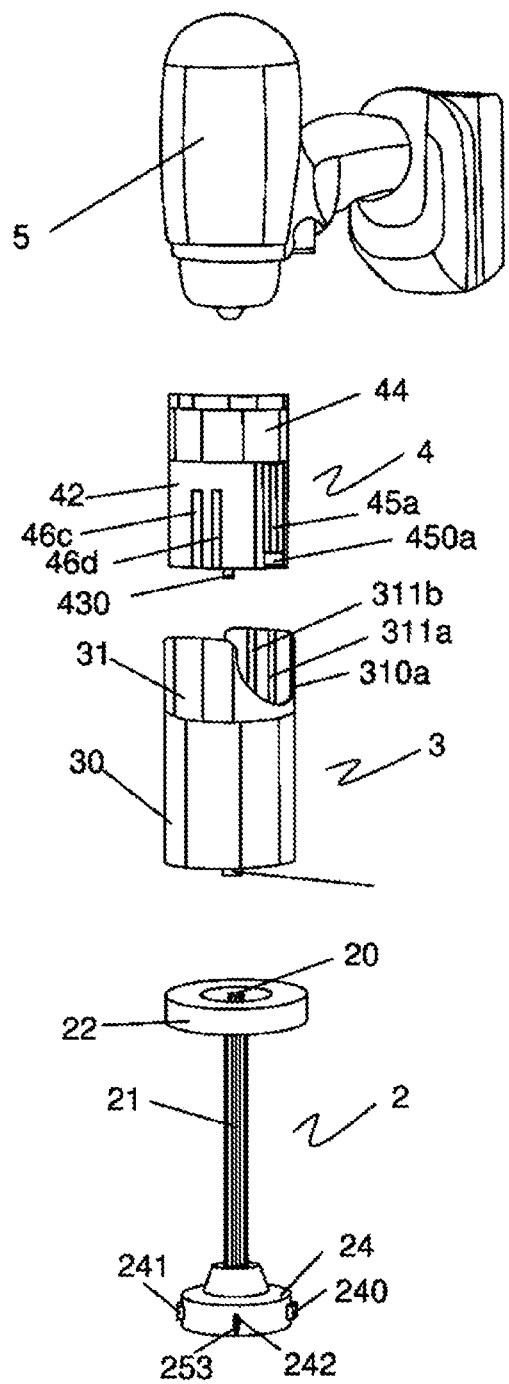
FIG. 4 illustrates an exploded view of a food processing device without a food processing container, the device being configured in accordance with embodiments of the present disclosure.

In other embodiments, the immersion blender 2 may be used to blend food items enclosed within a conventional food container, without the need for connection with the food processing container 1 (FIGS. 3-4).

In embodiments of the present disclosure, when the pass-through opening 160 receives the cap 24, the cap 24 is locked within the lid 16, the plurality of grooves 152a, 152b, 152c, 152d, 152e receive the plurality of protrusions 2010a, 2010b, 2010c, 2010d, 2010e, the coupling means 22 connects to the output shaft 33, the polygonal aperture 4300 receives the input shaft 32, and when the second elongated member 440 is inserted in the driver chuck, the food processing device of the present disclosure will be ready to be used.

In embodiments of the present disclosure, the food processing device, when operated, may blend foodstuff contained in the space gap 13 (FIGS. 1-2).

The food processing container 1 and the coupling unit 3 may be made of any suitable rigid material such as plastic.

The blades 15 and 23, shaft 150, shaft 20, shaft housing 20, and cap 24 may be made of any suitable rigid material, such as stainless steel.

The housing 30 of the gearbox 3 (FIGS. 15-16) may be made of any suitable rigid material, such as steel alloy or plastic.

The food processing device of this disclosure may be used indoors and is suitable to be used outdoors, such as in tailgating and camping activities.

The use of the term "and" in the claims is used to mean "and/or" unless explicitly indicated to refer to collective nature only.

As used herein with respect to an identified property or circumstance, "substantially" refers to a degree of deviation that is sufficiently small so as to not measurably detract from the identified property or circumstance. The exact degree of deviation allowable may in some cases depend on the specific context.

While the present disclosure has been made in detail and with reference to specific embodiments, it will be apparent to those skilled in the art that various additions, omissions, or amendments can be made without departing from the scope and spirit thereof.

What is claimed is:

1. A food processing device configured for blending foodstuff, the device comprising:
    an immersion blender having a shaft enclosed within a shaft housing, the shaft having an upper side and a lower side and being in operable connection with a first rotatable blade on the lower side;
    a gearbox in operable connection with the immersion blender; and
    a coupling unit having a slidable member in operable communication with the gearbox which contacts the shaft,
    wherein the slidable member of the coupling unit is contained in the gearbox and configured to drive the first rotatable blade via the shaft, and
    wherein the shaft is configured to contact the gearbox on the upper side and contact a blade shaft portion of the food processing device on the lower side of the shaft below the first rotatable blade.

2. The device of claim 1, further comprises:
    a food processing container with a base and a circumferential wall extending from the base, a handle, and a removable lid with a hingeably connected nozzle, an opening, and a pass-through aperture,
    wherein the base comprises a second rotatable blade extending from the base via the blade shaft portion having a plurality of grooves spaced from the base.

3. The device of claim 2, wherein the immersion blender is configured to rotate the second rotatable blade via the shaft connecting to the blade shaft portion.

4. The device of claim 2, wherein the second rotatable blade extends radially outwardly from the blade shaft portion, and
    wherein the second rotable blade comprises a plurality of extrusions.

5. The device of claim 4, wherein the plurality of grooves are configured to receive the plurality of extrusions.

6. The device of claim 1, wherein the immersion blender further comprises
    a cap slidable over the shaft housing,
    a locking mechanism configured to lock and unlock the shaft housing to the cap, and
    a coupler configured to connect the immersion blender to the gearbox.

7. The device of claim 6, wherein the opening of the removable lid is configured to receive the cap, and
    wherein the shaft and shaft housing are configured to pass through the pass-through aperture.

8. The device of claim 7, wherein the locking mechanism allows the shaft housing to slide within the cap only when the cap is connected to the opening.

9. The device of claim 7, wherein the locking mechanism locks the cap in a proximal position to the first rotatable blade when the cap is not connected to the opening to cover the first rotatable blade.

10. The device of claim 6, wherein the gearbox comprises a housing, a lateral wall with a plurality of extrusions, an input shaft, an output shaft, and a plurality of gear sets, and
    wherein the output shaft contacts the upper side of the shaft.

11. The device of claim 10, wherein a ratio of an angular speed of the output shaft to an angular speed of the input shaft is in a range of from 5 to 15.

12. The device of claim 10, wherein the extrusions in the lateral wall of the gearbox are configured to receive the plurality of grooves of the coupling unit.

13. The device of claim 1, further comprises:
    a driver in operable connection with the coupling unit.

14. The device of claim 13, wherein the driver comprises a rotary power tool with a chuck.

15. The device of claim 1, wherein the coupling unit comprises
    a main wall with a plurality of lateral apertures configured to receive protrusions extending from the slidable member and a plurality of grooves, and
    an auxiliary wall extending from the main wall.

16. The device of claim 15, wherein the slidable member comprises a first elongated member and a second elongated member coaxially aligned to each other, and
    wherein the first elongated member has an opening configured to receive an input shaft of the gearbox.

17. The device of claim 16, wherein the second elongated member is configured to be inserted in a driver chuck.

18. The device of claim 15, wherein the auxiliary wall is lined with an elastic material.

19. The device of claim 15, wherein the auxiliary wall is tapered.

20. The device of claim 15, wherein the auxiliary wall is configured to circumfuse a substantial part of a driver chuck.

* * * * *